(12) United States Patent
Kaneda et al.

(10) Patent No.: US 7,088,977 B2
(45) Date of Patent: *Aug. 8, 2006

(54) WIRELESS COMMUNICATION APPARATUS AND WIRELESS COMMUNICATION METHOD

(75) Inventors: Ryuusuke Kaneda, Yokohama (JP); Seiji Hagiwara, Yokosuka (JP); Tadao Takami, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 649 days.

This patent is subject to a terminal disclaimer.

(21) Appl. No.: 09/862,439

(22) Filed: May 23, 2001

(65) Prior Publication Data

US 2002/0006775 A1 Jan. 17, 2002

(30) Foreign Application Priority Data

May 24, 2000 (JP) ........................................ 2000-153688

(51) Int. Cl.
*H04B 1/10* (2006.01)

(52) U.S. Cl. ..................... 455/296; 455/63.1; 455/65

(58) Field of Classification Search ................ 455/65, 455/504, 506, 63.1, 295, 296; 375/219, 222, 375/231, 232, 233, 235, 240, 246, 350, 340, 375/346

See application file for complete search history.

(56) References Cited

U.S. PATENT DOCUMENTS

| | | | | |
|---|---|---|---|---|
| 4,590,615 | A | | 5/1986 | Ohtaki et al. |
| 5,249,233 | A | * | 9/1993 | Kennedy et al. ............... 381/13 |
| 5,428,832 | A | * | 6/1995 | Nohara et al. ............... 455/296 |
| 5,557,646 | A | * | 9/1996 | Honma ........................ 375/346 |

FOREIGN PATENT DOCUMENTS

| | | |
|---|---|---|
| EP | 0 766 416 | 4/1997 |
| JP | 58 014064 | 1/1983 |
| JP | 63-250223 | * 10/1988 |
| WO | WO95/34140 | 12/1995 |

* cited by examiner

*Primary Examiner*—Lee Nguyen
*Assistant Examiner*—Sanh Phu
(74) *Attorney, Agent, or Firm*—Oblon, Spivak, McClelland, Maier & Neustadt, P.C.

(57) ABSTRACT

A wireless communication apparatus is provided in which a wireless part receives multipath detection information sent from a wireless communication apparatus at the other end (a mobile station, for example) and provides the multipath detection information to a multipath component canceling signal generation part. The multipath component canceling signal generation part generates a multipath component canceling signal based on the multipath detection information, and provides the multipath component canceling signal to the wireless part. The wireless part sends the multipath component canceling signal with a send wave to the wireless communication apparatus at the other end.

8 Claims, 7 Drawing Sheets

WIRELESS COMMUNICATION APPARATUS AND WIRELESS COMMUNICATION METHOD

BACKGROUND OF THE INVENTION

1. Field of the Invention

The present invention generally relates to a wireless communication apparatus and a wireless communication method. More particularly, the present invention relates to a wireless communication apparatus and a wireless communication method in which multipath interference is relieved.

2. Description of the Related Art

FIG. 1 shows an configuration example of a mobile communication system. The mobile communication system includes mobile stations 22 and a base station 23 which are placed in each area. In addition, there is an obstacle 24 which reflects radio wave of mobile wireless communication.

In this configuration, when the base station 23 radiates a radio wave to the mobile station 22, the radio wave is reflected by the obstacle 24 so that the direct wave 25 and the reflected wave 26 arrive at the mobile station 22 via a plurality of paths. This is called multipath.

In the mobile station 22, when the direct wave 25 and the reflected wave 26 arrive at the antenna, they interfere with each other. As a result, when the direct wave 25 and the reflected wave 26 have opposite phases, signals are attenuated significantly. When the direct wave 25 and the reflected wave 26 are in phase, signals are amplified.

The level of received wave in the mobile station varies significantly according to the position of the mobile station due to the interference caused by the multipath. It is known that the interference occurs by wavelength of the wave.

Conventionally, in order to decrease degradation of signal transmission quality due to attenuation caused by interference and to keep good receiving state, a space diversity system is adopted in which a plurality of antennas which are placed different positions and/or which have different directions are provided for receiving signals.

In addition, for example, when communication which uses spreading codes is performed and when the phases of the direct wave and the reflected wave are not completely opposite so that they are not completely canceled, a RAKE receive system is adopted in which a plurality of receive circuits are provided such that the phases of the direct wave and the reflected wave are adjusted when they are received.

Describing the RAKE receive more precisely, the multipath direct wave 25 and the reflected wave 26 shown in FIG. 1 are received in different time positions with respect to the time base shown as the direct wave 27 and the reflected wave 28 in FIG. 2. Thus, by adding delays to the direct wave 27 and the reflected wave 28 properly and synthesizing them, it becomes possible that a plurality of multipaths can be synthesized and received.

However, according to the above-mentioned system, since a plurality of antennas are necessary, there is a problem in that the size of the mobile station becomes large.

In addition, in the RAKE receive system, there is a problem in that it is difficult to prevent interference between the direct wave and the reflected wave caused in the antennas, and, interference between received codes at the time of demodulation.

SUMMARY OF THE INVENTION

It is an object of the present invention to decrease interference by the multipath significantly to improve signal transmission quality without increasing the size of the mobile station.

The above object of the present invention is achieved by a wireless communication apparatus including:
- a multipath detection part which detects a state of multipath in the wireless communication apparatus; and
- a send part which sends multipath detection information detected by the multipath detection part to a wireless communication apparatus at the other end.

According to the present invention, the wireless communication apparatus at the other end can detects a state of multipath in the wireless communication apparatus which sent the multipath detection information and send a multipath component canceling signal.

The above object of the present invention is also achieved by a wireless communication apparatus including:
- a multipath component canceling signal generation part which generates a signal which cancels a multipath component in a wireless communication apparatus at the other end on the basis of multipath detection information representing a state of multipath sent from the wireless communication apparatus at the other end; and
- a send part which sends the signal which cancels the multipath component generated in the multipath component canceling signal generation part to the wireless communication apparatus at the other end.

According to the present invention, it becomes possible to remove or decrease influence of multipath in the wireless communication apparatus at the other end by sending the signal for canceling the multipath component to the wireless communication apparatus at the other end.

In the above-mentioned wireless communication apparatus, the multipath component canceling signal generation part may includes:
- a multipath component generation part which generates a multipath component on the basis of the multipath detection information representing the state of multipath in the wireless communication apparatus at the other end; and
- an interference wave detection part which detects an interference wave occurring between the multipath component and a send wave.

According to the present invention, the multipath component canceling signal can be generated.

In the above-mentioned wireless communication apparatus, the interference wave detection part may includes:
- a filter part which filters a synthesized wave of the multipath component and the send wave; and
- an interference wave signal generation part which generates an interference wave signal corresponding to that in the wireless communication apparatus at the other end by comparing output signal from the filter part and the send wave.

According to the present invention, the interference wave signal corresponding to an interference wave signal in the wireless communication apparatus of the other end can be generated.

The above-mentioned wireless communication apparatus may further includes:
- an opposite phase part which changes a phase of the interference wave signal to an opposite phase of the phase; and
- a send part which sends the interference wave signal having the opposite phase to the wireless communication apparatus at the other end.

Accordingly, by sending the phase opposite interference wave signal, the influence of multipath in the wireless communication apparatus at the other end can be removed or decreased.

In the above-mentioned wireless communication apparatus may send an opposite phase wave of the signal which cancels the multipath component at a time position of a multipath having no interference in order to cancel the signal which cancels the multipath component.

Accordingly, the signal which cancels the multipath component or interference opposite phase wave occurring at a time position of multipath which has no interference can be canceled so that it can be prevented that the multipath component which does not receive interference is attenuated.

The above object of the present invention is also achieved by a wireless communication method including the step of:

a wireless communication apparatus sending a signal which cancels a multipath component in a wireless communication apparatus at the other end to the wireless communication apparatus at the other end with a send signal.

In the above-mentioned wireless communication method, the signal which cancels the multipath component is a signal inverted from an interference wave signal generated from the multipath component in the wireless communication apparatus at the other end.

The above object of the present invention is also achieved by a wireless communication method including the steps of:

a first wireless communication apparatus detecting a state of multipath in the first wireless communication apparatus;

the first wireless communication apparatus sending multipath detection information on the state to a second wireless communication apparatus;

the second wireless communication apparatus receiving the multipath detection information;

the second wireless communication apparatus generating a signal for canceling a multipath component in the first wireless communication apparatus on the basis of the multipath detection information; and the second wireless communication apparatus sending the signal for canceling the multipath component to the first wireless communication apparatus.

According to the present invention, a wireless communication method which is applicable to the above-mentioned wireless communication apparatus can be provided in which interference due to multipath can be significantly decreased so that signal transmission quality is improved without increasing the size of a mobile station.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described with figures.

(First Embodiment)

Figure 1:
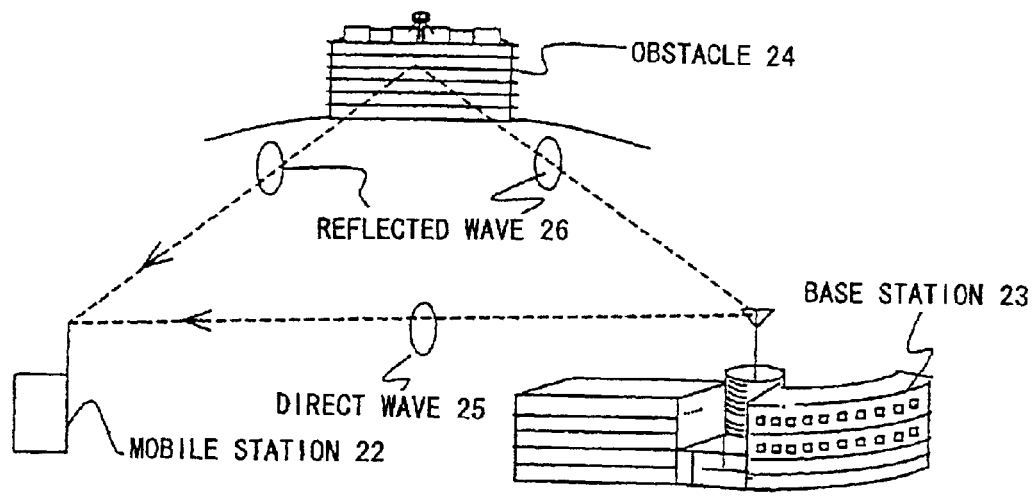
FIG. 1 shows an configuration example of a mobile communication system.
Figure 2:
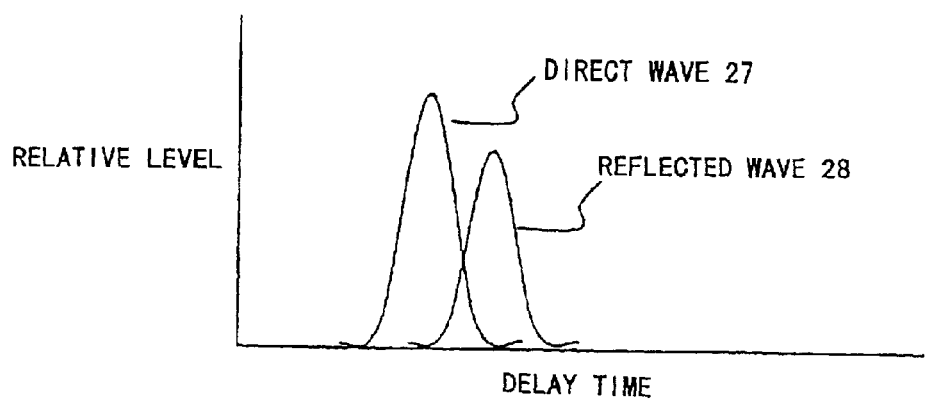
FIG. 2 shows a receive state in a mobile station in the mobile communication system.
Figure 3:
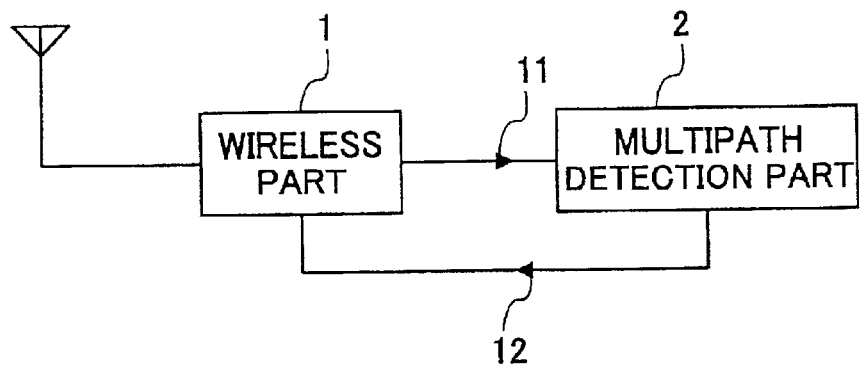
FIG. 3 is a block diagram of a wireless communication apparatus of a first embodiment.

A wireless communication apparatus of the first embodiment is configured as shown in FIG. 3 for example.

The wireless communication apparatus (for example, mobile station) includes a wireless part 1 and a multipath detection part 2 which detects multipath.

The wireless part 1 receives a radio wave sent by a wireless communication apparatus at the other end (for example, a base station), and provides a received wave 11 to the multipath detection part 2. The multipath detection part 2 detects multipath from the received signal provided from the wireless part 1 and provides multipath detection information 12 to the wireless part 1. The wireless part 1 sends the multipath detection information provided from the multipath detection part 2 to a wireless communication apparatus at the other end of communication.

The detection information 12 of the multipath detected by the multipath detection part 2 includes relative delay time of the path, relative level of the path and the like, for example.

The multipath can be detected by detecting delay time and levels of paths by using path search of the RAKE.

(Second Embodiment)

Figure 4:
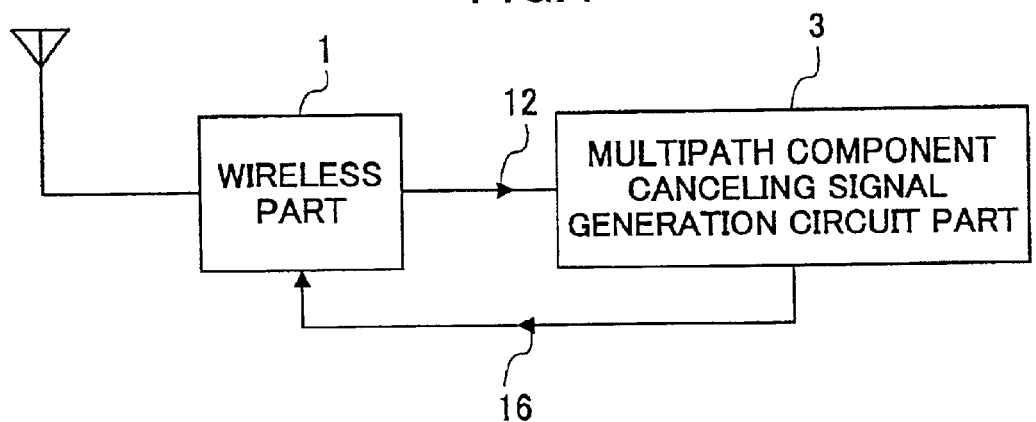
FIG. 4 is a block diagram of a wireless communication apparatus of a second embodiment.

The wireless communication apparatus of the second embodiment is configured as shown in FIG. 4 for example.

In FIG. 4, the wireless communication apparatus (for example, the base station) includes a wireless part 1 and a multipath component canceling signal generation circuit part 3.

The wireless part 1 receives multipath detection information 12 sent from a wireless communication apparatus at the other end of communication (the mobile station, for example) and provides the multipath detection information 12 to the multipath component canceling signal generation circuit part 3.

The multipath component canceling signal generation circuit part 3 generates a multipath component canceling signal 16 for canceling multipath components from the multipath detection information 12, and provides the multipath component canceling signal 16 to the wireless part 1. The wireless part 1 sends the multipath component canceling signal provided by the multipath component canceling signal generation circuit part 3.

The multipath component canceling signal is sent to the wireless communication apparatus which sent the multipath detection information with a send wave.

(Generation of Interference Wave)

Figure 5:
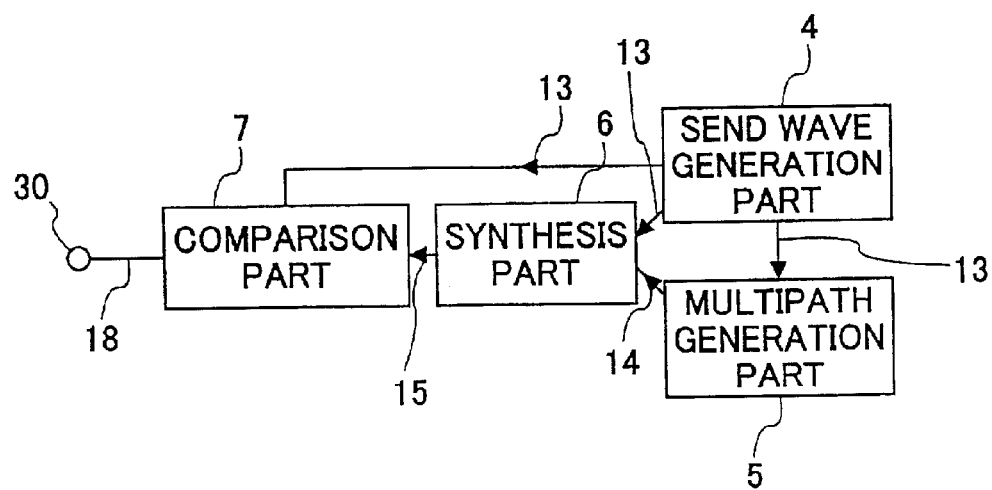
FIG. 5 is a figure for explaining generation of an interference wave in the wireless communication apparatus.

FIG. 5 is a figure for explaining generation of an interference wave in the wireless communication apparatus (the base station, for example).

The wireless communication apparatus includes a send wave generation part 4, a multipath generation part 5, a synthesis part 6 and a comparison part 7.

The send wave 13 output from the send wave generation part 4 is provided to the multipath generation part 5, the comparison part 7 and the synthesis part 6.

The multipath generation part 5 generates a multipath wave 14 on the basis of the multipath detection information detected by the mobile station, for example, and provides the multipath wave 14 to the synthesis part 6. The synthesis part 6 synthesizes the send wave 13 and the multipath wave 14, and provides the synthesized wave 15 to the comparison part 7. The synthesized wave 15 represents a signal which replicates the state of the multipath received by the mobile station. The comparison part 7 compares the send wave 13 with the synthesized wave 15, generates an interference wave 18 and outputs the interference wave 18 to a terminal 30.

(Third Embodiment)

Figure 6:
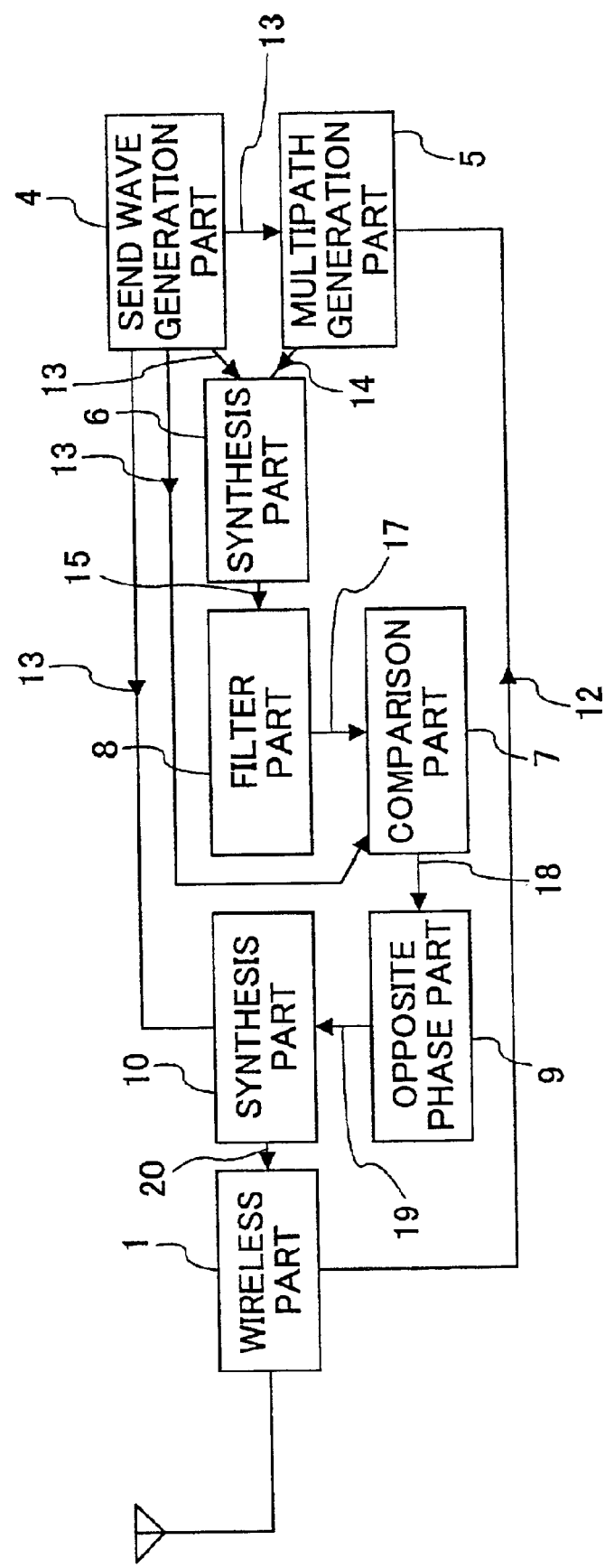
FIG. 6 is a block diagram of a wireless communication apparatus of a third embodiment.

The wireless communication apparatus of the third embodiment is configured as shown in FIG. 6 for example.

As shown in FIG. 6, the wireless communication apparatus (the base station, for example) includes a wireless part 1, a send wave generation part 4, a multipath generation part 5, a synthesis part 6, a comparison part 7, a filter part 8, an opposite phase part 9 and a synthesis part 10.

The wireless part 1 provides the multipath detection information 12 received from the wireless communication apparatus shown in FIG. 3 to the multipath generation part 5. The send wave generation part 4 provides the send wave 13 to the multipath generation part 5, the synthesis part 6, the comparison part 7 and the synthesis part 10.

The multipath generation part 5 generates a multipath wave 14 based on the multipath detection information sent from a wireless communication apparatus at the other end (the mobile station, for example) and provides the multipath wave 14 to the synthesis part 6.

Figure 7:
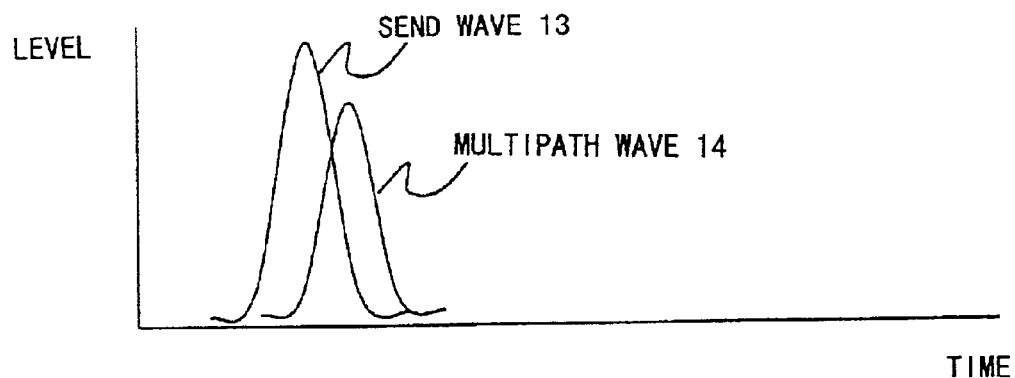
FIG. 7 shows a synthesized wave 15 of a send wave 13 and a multipath wave 14.

The synthesis part 6 synthesizes the send wave 13 and the multipath wave 14, and provides the synthesized wave 15 of the send wave 13 and the multipath wave 14 to the filter part 8. FIG. 7 shows the synthesized wave 15 of the send wave 13 and the multipath wave 14.

Figure 8:
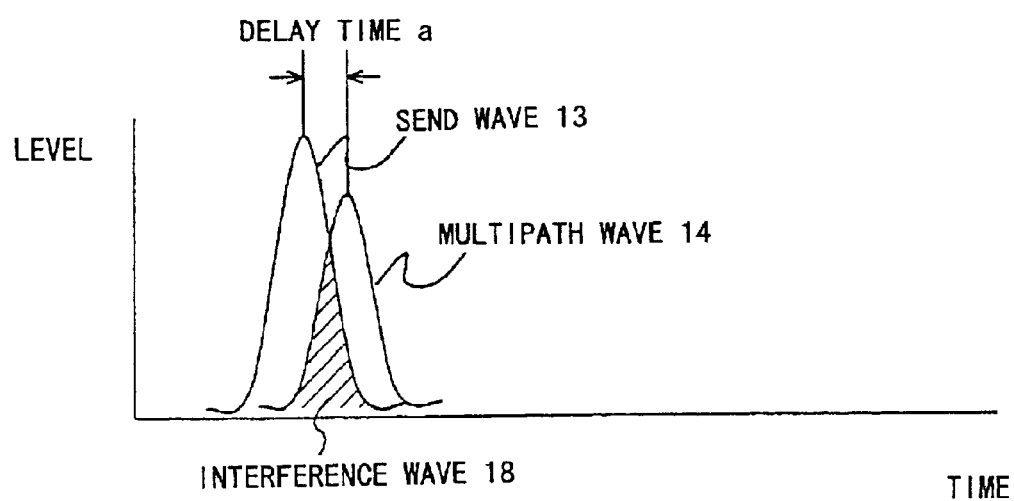
FIG. 8 is a figure for explaining an interference wave.

In the synthesized wave, as shown in FIG. 8, the part (the diagonally shaded area) on which the send wave 13 and the multipath wave 14 overlap one another becomes the interference wave 18. The multipath wave 14 has a delay time "a" with respect to the send wave 13.

Figure 9:
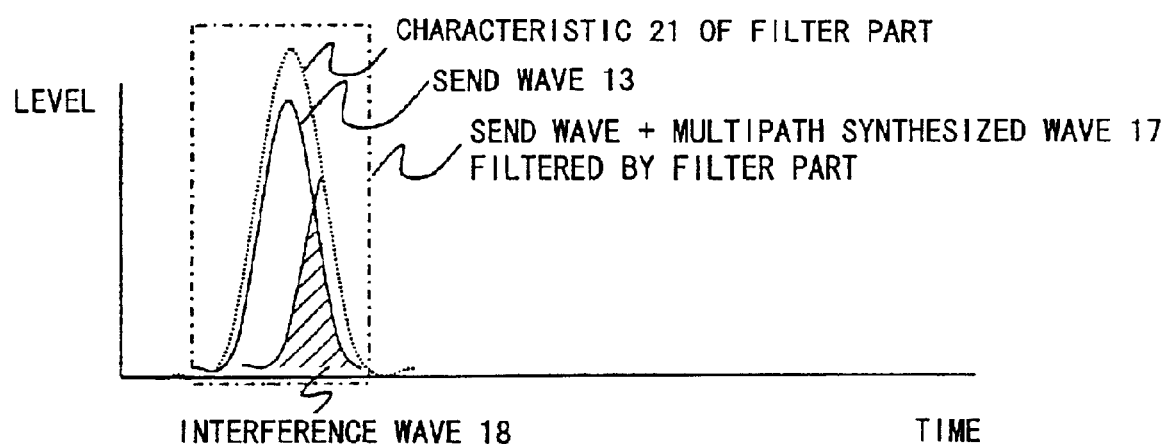
FIG. 9 shows characteristic 21 of a filter part 8 and output signal from the filter part (send wave+multipath synthesized wave 17)

The send wave 13 and the multipath wave 14 are filtered to a band of basic waves by the filter part 8. The send wave+multipath synthesized wave 17 which is filtered by the filter part 8 is provided to the comparison part 7. FIG. 9 shows the characteristic 21 of the filter part 8 and output signal from the filter part (send wave+multipath synthesized wave 17). Although the characteristic 21 of the filter part 8 shown in FIG. 9 shows filtering for time and frequencies, filtering only for time may be performed. In such a case, although perfect interference wave can not be obtained, it becomes possible to decrease interference caused by the multipath.

Figure 10:
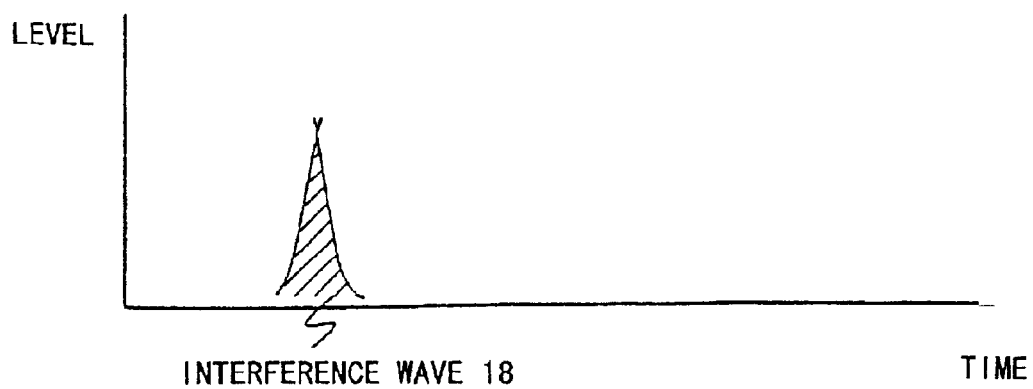
FIG. 10 shows the interference wave 18 generated by a comparison part 7.

The comparison part 7 compares the send wave+multipath synthesized wave 17 which was filtered by the filter part 8 with the send wave 13 provided by the send wave generation part 4. And, then, the comparison part 7 subtracts the send wave 13 from the send wave+multipath synthesized wave 17 and generates the interference wave 18 and provides the interference wave 18 to the opposite phase part 9. FIG. 10 shows the interference wave 18 generated by the comparison part 7.

The opposite phase part 9 changes the phase of the interference wave 18 to opposite phase, and, as a result, generates an interference signal opposite phase wave 19. Then, the opposite phase part 9 provides the interference signal opposite phase wave 19 to the synthesis part 10. When the interference signal opposite phase wave 19 and the send wave+multipath synthesized wave 17 filtered by the filter part 8 are added, the send wave 13 is restored.

Figure 11:
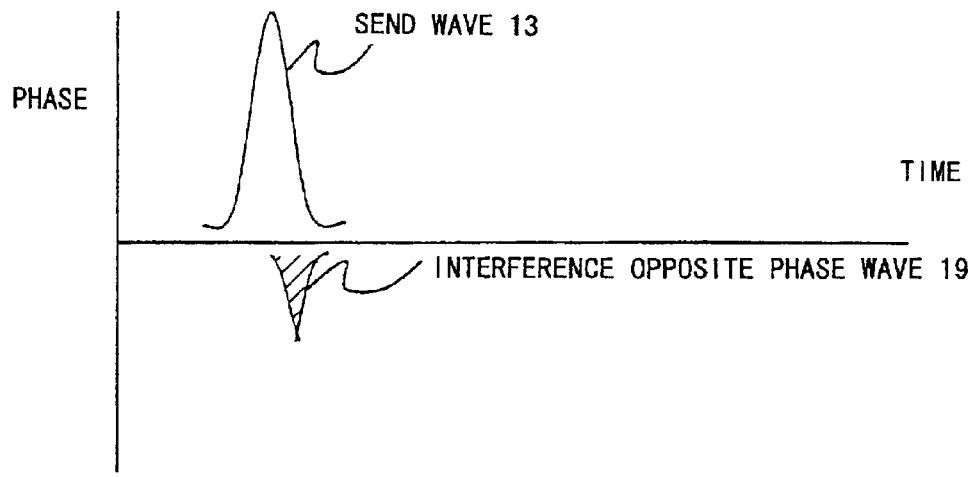
FIG. 11 shows an interference signal opposite phase wave+send wave which is synthesized in a synthesis part 10.

The synthesis part 10 synthesizes the interference signal opposite phase wave 19 provided from the opposite phase part 9 and the send wave 13 provided from the send wave generation part 4 and provides the interference signal opposite phase wave+send wave 20 to the wireless part 1. FIG. 11 shows the interference signal opposite phase wave+send wave 20 which is synthesized in the synthesis part 10. The wireless part 1 sends the interference signal opposite phase wave+send wave 20 by wireless communication.

In the following, a case when the interference signal opposite phase wave+send wave 20 sent from the wireless part 1 of the wireless communication apparatus (the base station, for example) shown in FIG. 6 is received by the wireless communication apparatus at the other end (the mobile station, for example) shown in FIG. 3 will be described.

(Operation in the Wireless Communication Apparatus Shown in FIG. 3)

(step 1) The wireless communication apparatus shown in FIG. 3 sends the multipath detection information detected by the multipath detection part 2 to the wireless communication apparatus at the other end.

(Operation in the Wireless Communication Apparatus Shown in FIG. 6)

(step 2) The wireless communication apparatus shown in FIG. 6 receives a signal sent from the wireless communication apparatus shown in FIG. 3. Then, the multipath generation part 5 generates multipath component from the multipath detection information indicating multipath state of the wireless communication apparatus shown in FIG. 3.

(step 3) The synthesis part 6 synthesizes the multipath component generated by the multipath generation part 5 and the send basic wave generated by the send wave generation part 4.

(step 4) The filter part 8 performs filtering in which the signal synthesized by the synthesis part 6 is flittered to a band of basic waves.

(step 5) The comparison part 7 compares the filtered signal with the send wave generated by the send wave generation part 4 and generates the interference wave signal corresponding to that in the wireless communication apparatus shown in FIG. 3.

(step 6) The phase of the interference wave signal which is output from the comparison part 7 is changed to opposite phase by the opposite phase part 9.

(step 7) The synthesis part 10 synthesizes the send wave generated by the send wave signal generation part 4 and the interference wave signal in which the phase is changed to opposite by the opposite phase part 9. Then, the wireless part 1 sends the synthesized signal to the wireless communication apparatus shown in FIG. 3.

Figure 12:
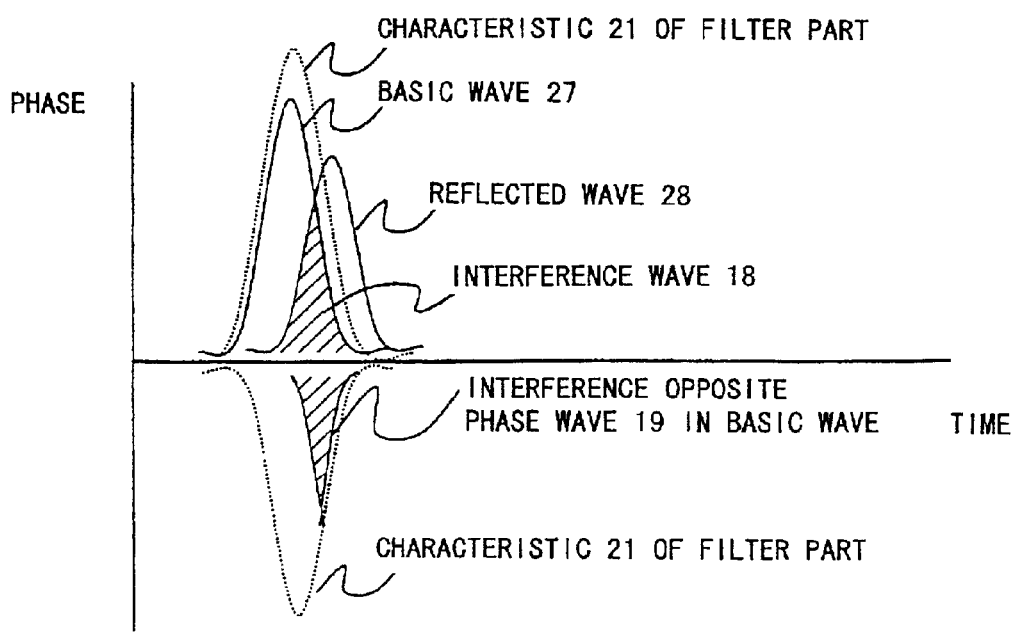
FIG. 12 shows received phase signals which are received by the mobile station which receives the signal shown in FIG. 11.

(step 8) The wireless communication apparatus 1 shown in FIG. 3 receives signals shown in FIG. 12.

Figure 13:
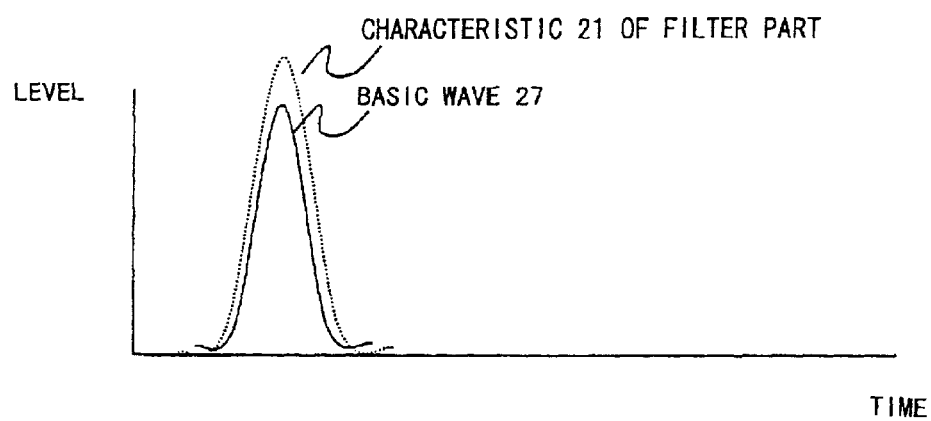
FIG. 13 shows a signal which is restored in the mobile station.

The interference wave 18 and the interference signal opposite phase wave 19 shown in FIG. 12 cancel one another. Thus, as shown in FIG. 13, a signal can be restored in which the multipath interference is removed so that it becomes possible to receive in good receive condition.

The closed loop for removing multipath may be performed in which the multipath detection part 2 detects the reflected wave 28 by using a path searcher in the multipath detection part 2 before the wave passes though a filter part 8 in the RAKE of the multipath detection part 2, then, the multipath detection information 12 is sent from the wireless part 1 so that the wireless communication apparatus shown in FIG. 6 gets feedback.

In addition, in the above description, the interference opposite phase wave is generated with respect to the multipath interference wave having delay time "a" as shown in FIG. 7. However, multipath interference having delay time other than "a" can be prevented by generating interference opposite phase wave with respect to multipath interference wave having delay time other than "a".

In addition, a multipath which is not interfered becomes a part of received signal after received by RAKE. Thus, it is necessary to prevent that received signal is attenuated due to the interference opposite phase wave for the multipath which is not interfered.

Figure 14:
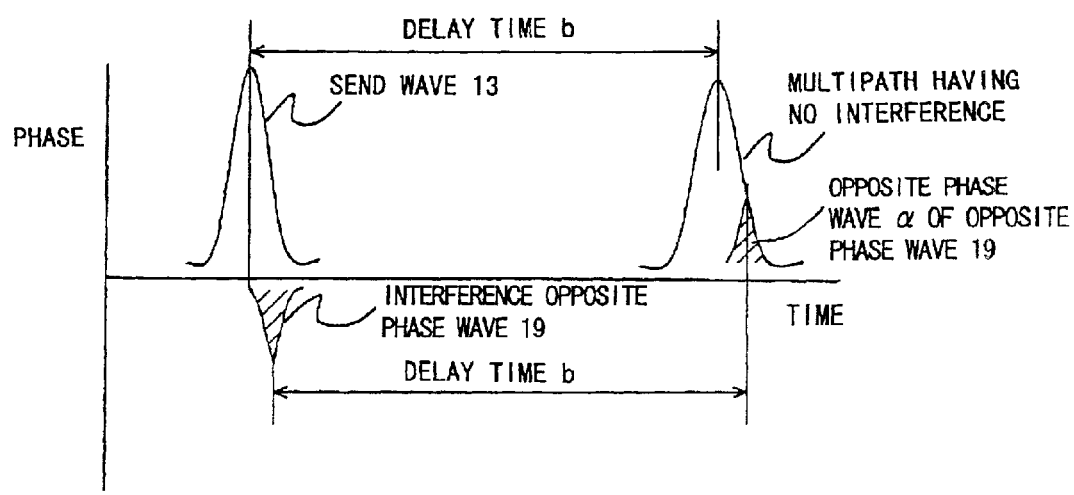
FIG. 14 is a figure for explaining a opposite phase wave of the interference opposite phase wave 19.

For this purpose, as shown in FIG. 14, when there is a multipath which has delay time "b" in which interference does not occur, the wireless communication apparatus shown in FIG. 6 sends a wave adding a phase opposite wave of the interference opposite phase wave 19 at a time position of delay time "b" on the basis of notification from the wireless communication apparatus at the other end in order to remove the influence of the interference opposite phase wave.

In the above-mentioned description, although an example in which a base station sends a signal and a mobile station receives it is described, the present invention can be applied also to a case in which the mobile station sends a signal and the base station receives it. In addition, the present invention can be applied to communication between base stations and communication between fixed stations.

As mentioned above, according to the present invention, it becomes possible to decrease interference caused by multipath by receiving multipath detection information and sending opposite characteristic component of the multipath with a send signal.

The present invention is not limited to the specifically disclosed embodiments, and variations and modifications may be made without departing from the scope of the invention.

What is claimed is:

1. A wireless communication apparatus comprising:
a multipath detection part which detects a state of multipath in said wireless communication apparatus; and
a send part which sends multipath detection information detected by said multipath detection part to another wireless communication apparatus via a wireless network;
wherein said another wireless communication apparatus generates a multipath component using said multipath detection information, generates a signal inverted from an interference wave signal detected between said multipath component and a send signal, and sends the inverted signal and said send signal to said wireless communication apparatus via the wireless network, and said wireless communication apparatus receives the inverted signal and the send signal so that an interference is canceled by the inverted signal.

2. A wireless communication apparatus comprising:
a multipath component canceling signal generation part which generates a signal which cancels a multipath component in another wireless communication apparatus on the basis of multipath detection information representing a state of multipath sent from said another wireless communication apparatus via a wireless network; and
a send part which sends said signal which cancels said multipath component generated in said multipath component canceling signal generation part to said another wireless communication apparatus, wherein said multipath component canceling signal generation part includes
a multipath component generation part which generates a multipath component on the basis of said multipath detection information representing said state of multipath in said another wireless communication apparatus, and
an interference wave detection part which detects an interference wave occurring between said multipath component and a send wave, said interference wave detection part includes
a filter part which filters a synthesized wave of said multipath component and said send wave, and
an interference wave signal generation part which generates an interference wave signal corresponding to that in said wireless communication apparatus at the other end by comparing output signal from said filter part and said send wave.

3. The wireless communication apparatus as claimed in claim 2, further comprising:
an opposite phase part which changes a phase of said interference wave signal to an opposite phase of said phase; and
a send part which sends said interference wave signal having said opposite phase to said wireless communication apparatus at the other end.

4. The wireless communication apparatus as claimed in claim 3, wherein said wireless communication apparatus sends an opposite phase wave of said signal which cancels said multipath component at a time position of a multipath having no interference in order to cancel said signal which cancels said multipath component.

5. A wireless communication method comprising the steps of:
generating, by a wireless communication apparatus, a multipath component using multipath direction informatio sent from another wireless communication apparatus via a wireless communication apparatus via a wireless network;
generating a signal inverted from an interface wave signal detected between said multipath component and a send signal;
sending from said wireless communication apparatus a signal to said another wireless communication apparatus to said another wireless communication apparatus with said send signal via said wireless network,
wherein said another wireless communication apparatus receives said signal and said send signal so than an interference is canceled by said signal.

6. A wireless communication method comprising the steps of:
a first wireless communication apparatus detecting a state of multipath in said first wireless communication apparatus;

said first wireless communication apparatus sending multipath detection information on said state to a second wireless communication apparatus via a wireless network;

said second wireless communication apparatus receiving said multipath detection information;

said second wireless communication apparatus generating a multipath component using said multipath detection information, and generating a signal for canceling an interference in said first wireless communication apparatus, wherein said signal is a signal inverted from an interference wave signal detected between said multipath component and a send signal; and said second wireless communication apparatus sending said signal for canceling said interference to said first wireless communication apparatus with said send signal via the wireless network.

7. A wireless communication apparatus comprising:

a multipath component canceling signal generation part which generates a multipath component using multipath detection information representing a state of multipath sent from another wireless communication apparatus, and generates a signal which cancels an interference in said another wireless communication apparatus, wherein said signal is a signal inverted from an interference wave signal detected between said multipath component and a send signal; and a send part which sends said signal which cancels said interference generated in said multipath component canceling signal generation part to said another wireless communication apparatus with said send signal via the wireless network.

8. A wireless communication apparatus comprising:

a multipath component canceling signal generation part which generates a signal which cancels a multipath component in another wireless communication apparatus on the basis of multipath detection information representing a state of multipath sent from said another wireless communication apparatus via a wireless network; and a send part which sends said signal which cancels said multipath component generated in said multipath component canceling signal generation part to said another wireless communication apparatus via the wireless network, wherein said signal which cancels said multipath component is a signal inverted from an interference wave signal generated by using multipath detection information sent from said another wireless communication apparatus via the wireless network, and wherein said wireless communication apparatus sends an opposite phase wave of said signal which cancels said multipath component at a time position of a multipath having no interference in order to cancel said signal which cancels said multipath component.

* * * * *

UNITED STATES PATENT AND TRADEMARK OFFICE
CERTIFICATE OF CORRECTION

| | | |
|---|---|---|
| PATENT NO. | : 7,088,977 B2 | Page 1 of 1 |
| APPLICATION NO. | : 09/862439 | |
| DATED | : August 8, 2006 | |
| INVENTOR(S) | : Kaneda et al. | |

It is certified that error appears in the above-identified patent and that said Letters Patent is hereby corrected as shown below:

On the title page, the Terminal Disclaimer information is incorrect. Item (45) and the Notice information should read as follows:

--(45) Date of Patent: Aug. 8, 2006

(* ) Notice: Subject to any disclaimer, the term of this patent is extended or adjusted under 35 U.S.C. 154(b) by 649 days.--

Signed and Sealed this

Fifth Day of June, 2007

JON W. DUDAS
*Director of the United States Patent and Trademark Office*